US012795524B2

(12) United States Patent
Lee et al.

(10) Patent No.: US 12,795,524 B2
(45) Date of Patent: Nov. 10, 2026

(54) METHOD OF PROVIDING NETWORK SLICES IN WIRELESS COMMUNICATION SYSTEM

(71) Applicant: Samsung Electronics Co., Ltd., Gyeonggi-do (KR)

(72) Inventors: Hoyeon Lee, Gyeonggi-do (KR); Dongeun Suh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 246 days.

(21) Appl. No.: 18/790,080

(22) Filed: Jul. 31, 2024

(65) Prior Publication Data

US 2025/0048235 A1 Feb. 6, 2025

(51) Int. Cl.
*H04W 48/16* (2009.01)
*H04W 48/18* (2009.01)

(52) U.S. Cl.
CPC ........... *H04W 48/16* (2013.01); *H04W 48/18* (2013.01)

(58) Field of Classification Search
CPC ..... H04W 48/16; H04W 48/18; H04W 48/08; H04W 76/20
See application file for complete search history.

(56) References Cited

U.S. PATENT DOCUMENTS

2022/0095199 A1* 3/2022 Kim ...................... H04W 48/02
2022/0256439 A1* 8/2022 Casati ................... H04W 48/06
2023/0130966 A1 4/2023 Suh et al.
2023/0397146 A1* 12/2023 Ryu ........................ H04W 8/22
2024/0298253 A1* 9/2024 Talebi Fard .......... H04W 48/18
2024/0349179 A1* 10/2024 Starsinic ............... H04W 48/16
2025/0071669 A1* 2/2025 Ishii ...................... H04W 48/20

OTHER PUBLICATIONS

3GPP TS 38.24.501 V18.3.1 (Jun. 2023), pp. 1099.
International Search Report dated Oct. 29, 2024 Issued in counterpart application No. PCT/KR2024/011293, 8 pages.
3GPP TS 23.501 V18.2.2, (Jul. 2023), 684 pages.
LG Electronics et al., “Improved Network Control of a Network Slice—Without Roaming”, S2-2307558, 3GPP TSG-SA2 Meeting #157, May 22-26, 2023, 64 pages.

* cited by examiner

*Primary Examiner* — Hashim S Bhatti
(74) *Attorney, Agent, or Firm* — The Farrell Law Firm, P.C.

(57) ABSTRACT

The disclosure relates to a 5G or 6G communication system for supporting a higher data transmission rate. A method performed by an AMF in a wireless communication system is provided. The method includes receiving, from a UE, requested NSSAI including a plurality of S-NSSAI, identifying whether each of the plurality of S-NSSAI is available, identifying a number of S-NSSAIs included in an allowed NSSAI; in case that the number of S-NSSAIs in the allowed NSSAI is less than a maximum number of S-NSSAIs for the allowed NSSAI, determining to include alternative S-NSSAI for a first S-NSSAI that is not available, and in case that the number of S-NSSAIs in the allowed NSSAI is at least equal to the maximum number of S-NSSAIs for the allowed NSSAI, determining S-NSSAIs for the allowed NSSAI based on whether the each of the plurality of S-NSSAI is associated with a PDU session.

16 Claims, 12 Drawing Sheets

| 8 7 6 5 4 3 2 1 | |
|---|---|
| Alternative NSSAI IE | octet 1 |
| Length of Alternative NSSAI contents | octet 2 |
| Entry 1 | octet 3*<br>octet a* |
| Entry 2 | octet a+1*<br>octet b* |
| … | octet b+1*<br>octet c* |
| Entry n | octet c+1*<br>octet d* |

Table 1

FIG. 11

| 8 7 6 5 4 3 2 1 | |
|---|---|
| S-NSSAI to be replaced | octet 3<br>octet x |
| Alternative S-NSSAI | octet x+1<br>octet a |

Table 2

FIG. 12

METHOD OF PROVIDING NETWORK SLICES IN WIRELESS COMMUNICATION SYSTEM

CROSS REFERENCE TO RELATED APPLICATION

The present application claims priority to Korean Patent Application No. 10-2023-0100224, which was filed in the Korean Intellectual Property Office on Aug. 1, 2023, the entire content of which is incorporated herein by reference.

BACKGROUND

1. Field

The disclosure relates generally to an apparatus and a method for providing network slices in a wireless communication system.

2. Description of Related Art $5^{th}$ generation (5G) mobile communication technologies define broad frequency bands such that high transmission rates and new services are possible, and can be implemented in "sub 6 gigahertz (GHz)" bands such as 3.5 GHZ, and in "l6 GHz" bands, which may be referred to as mmWave, including 28 GHz and 39 GHz.

In addition, it has been considered to implement $6^{th}$ generation (6G) mobile communication technologies (e.g., referred to as beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

Since the initial development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input, multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for relatively large amounts of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by newer 5G mobile communication technologies, e.g., physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, a non-terrestrial network (NTN), which provides UE-satellite direct communication for providing coverage in an area in which communication with terrestrial networks is unavailable, and positioning.

There is also ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR).

There is also ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the number of devices that will be connected to communication networks is expected to exponentially increase, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Furthermore, such development of 5G mobile communication systems will serve as a basis for developing new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

Accordingly, an aspect of the disclosure is to provide a method and an apparatus for providing network slices in a wireless communication system.

Another aspect of the disclosure is to resolve a situation in which allowed network slice selection assistance information (NSSAI) and configured NSSAI exceed a predetermined number of S-NSSAIs due to a network slice replacement function.

Another aspect of the disclosure, is provide a method and apparatus for determining whether to provide alternative single NSSAI (S-NSSAI), based on whether protocol data unit (PDU) sessions for S-NSSAIs have been established when S-NSSAIs that exceed the maximum number of S-NSSAIs configured for allowed NSSAIs are included in the allowed NSSAIs, it may be.

In accordance with an aspect of the disclosure, a method performed by an access and mobility management function (AMF) in a wireless communication system is provided. The method includes receiving, from a UE, requested NSSAI including a plurality of S-NSSAI, identifying whether each of the plurality of S-NSSAI is available, identifying a number of S-NSSAIs included in an allowed NSSAI, in case that the number of S-NSSAIs in the allowed NSSAI is less than a maximum number of S-NSSAIs for the allowed NSSAI, determining to include alternative S-NSSAI for a first S-NSSAI which is not available, and in case that the number of S-NSSAIs in the allowed NSSAI is at least equal to the maximum number of S-NSSAIs for the allowed NSSAI, determining S-NSSAIs for the allowed NSSAI based on whether the each of the plurality of S-NSSAI is associated with a PDU session.

In accordance with another aspect of the disclosure, a method performed a UE in a wireless communication system is provided. The method includes transmitting, to an AMF, a requested NSSAI including a first S-NSSAI to be included in an allowed NSSAI and a second S-NSSAI, receiving, from the AMF, the allowed NSSAI, identifying whether the allowed NSSAI includes an alternative S-NSSAI for the first S-NSSAI, and in case that the alternative S-NSSAI is included in the allowed NSSAI, modifying network slice information for a PDU session associated with the first S-NSSAI to the alternative NSSAI.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 11 illustrates examples of alternative NSSAIs IEs according to an embodiment; and FIG. 12 illustrates example entries according to an embodiment.

DETAILED DESCRIPTION OF THE INVENTION

Figure 1:
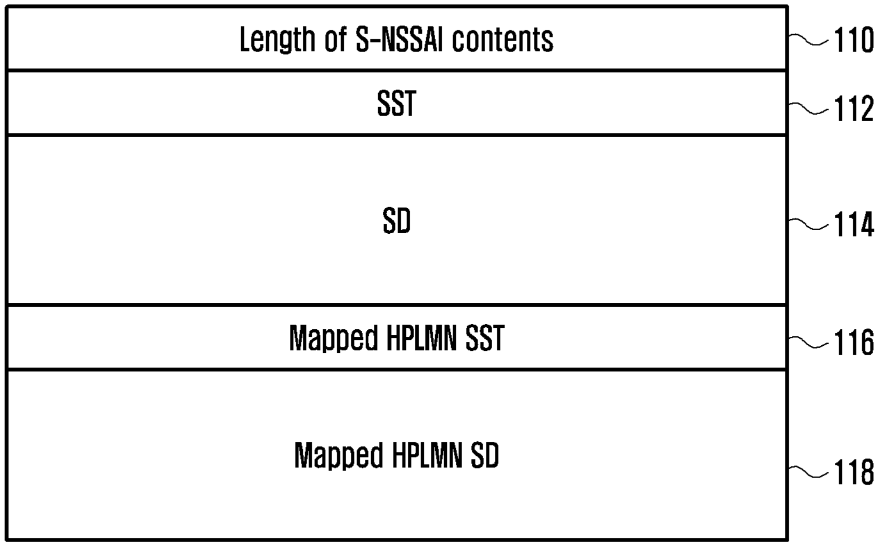
FIG. 1 illustrates a configuration of an S-NSSAI information element (IE) according to an embodiment.

Hereinafter, various embodiments of the present disclosure are described in detail with reference to the accompanying drawings, wherein the same elements may be designated by the same reference numerals although they are shown in different drawings.

In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure.

In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, e.g., "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The disclosure relates generally to an apparatus and a method for providing network slices in a wireless communication system. More specifically, the disclosure describes a technology for controlling and managing UE configuration information in a mobile communication network system that provides a network slice function in a wireless communication system.

5G network system architecture and procedure have been standardized in the 3$^{rd}$ generation partnership project (3GPP) standard. A mobile communication operator may provide various services in a 5G network. However, the mobile communication operator should to satisfy different service requirements for respective services (e.g., delay time, communication range, data rate, bandwidth, reliability, etc.) in order to provide services. To this end, the mobile communication operator may configure network slices and allocate network resources suitable for specific services for each network slice or each network slice set. The network resources may include a network function (NF) or logical resources provided by the NF, allocation of radio resources by the BS, etc.

For example, the mobile communication operator may configure a network slice A to provide a mobile broadband service, configure a network slice B to provide a vehicle communication service, and configure a network slice C to provide an Internet of things (IoT) service. As described above, the 5G network may provide the corresponding service in a network slice specialized for each service characteristic. As a delimiter that separates network slices, S-NSSAI, as defined in the 3GPP, may be used.

FIG. 1 illustrates a configuration of an S-NSSAI IE according to an embodiment.

Referring to FIG. 1, the S-NSSAI includes a slice/service type (SST) 116 used in a home public land mobile network (HPLMN), a slice differentiator (SD) 118 used in the HPLMN, an SST 112 used in a serving public land mobile network (PLMN), and an SD 114 used in the serving PLMN.

In a non-roaming situation, the SST 112 used in the serving PLMN may be the SST 116 used in the HPLMN, and the SD 114 used in the serving PLMN may be the SD 118 used in the HPLMN.

In a roaming situation, the SST 112 used in the serving PLMN may be used in a visited PLMN (VPLMN), and the SD 114 used in the serving PLMN may be used in the VPLMN.

Values of each SST and each SD constituting one S-NSSAI may be or may not be included in S-NSSAI according to a situation.

NSSAI may be constituted by one or more S-NSSAIs. For example, the NSSAI may include configured NSSAI stored in the UE, requested NSSAI requested by the UE, allowed NSSAI that the UE is permitted to use according to a determination of an NF (e.g., an AMF, a network slice selection function (NSSF), etc.) of a 5G core network, subscribed NSSAI to which the UE has subscribed, etc. However, these different NSSAI are only examples, and the disclosure is not limited thereto.

According to an embodiment of the disclosure, in order to efficiently use limited network resources, a maximum number of S-NSSAIs that NSSAIs can include may be limited.

For example, a number of bearers corresponding to physical network resources that a UE can configure for data transmission and reception and a number of PDU sessions related thereto may be limited. Specifically, the number of S-NSSAIs included in allowed NSSAIs may be limited in consideration of maximum configurable bearers and PDU sessions that the UE can use. For example, the total number of S-NSSAIs included in the allowed NSSAIs may be limited to not exceed a predetermined number (e.g., 8 S-NSSAIs). The predetermined number may be determined as a different value according to an operator policy or the like.

The UE can use network slices allowed by the network, and accordingly, a request for network slices that is larger than or equal to the network slices allowed by the network is a request that cannot be allowed anyway, which may waste resources and may influence a method of determining network slices requested by the UE. Accordingly, requested NSSAIs that are slices requested by the UE may not exceed the total number of S-NSSAIs (e.g., 8 S-NSSAIs) that may be included in the allowed NSSAIs.

The network may configure, in the UE, a sufficiently larger number of slices than the slices requested or allowable by the UE. However, a function of configuring too many slices in the UE may waste resources as the UE has limited storage functions/resources. Accordingly, the total number of S-NSSAIs included in the configured NSSAIs may be configured as the number of S-NSSAIs that is sufficiently larger than the number of allowed slices and sufficient to efficiently use limited resources of the UE (e.g., a total of 16 S-NSSAIs), e.g., according to an operator policy or the like.

The AMF may constitute the allowed NSSAIs with intersection of the requested NSSAIs (e.g., including a maximum of 8 S-NSSAIs), subscribed S-NSSAIs (no limitation in the number thereof), and S-NSSAIs that can be supported at a UE location (there is no limitation in the number thereof). That is, the allowed NSSAIs are designed to include up to the same number of S-NSSAIs (e.g., a maximum of 8 S-NSSAIs) as the maximum number of S-NSSAIs that the requested NSSAIs can include. When the allowed NSSAIs include more than 8 S-NSSAIs, the UE may store the first 8 S-NSSAIs and ignore the remaining S-NSSAIs.

A unified data management (UDM) may transmit a maximum of 16 subscribed S-NSSAIs to the AMF. That is, since the UDM transmits S-NSSAIs corresponding to the number that can be included in the configured NSSAIs to AMF, the configured NSSAIs are designed to include a maximum of 16 S-NSSAIs. When the configured NSSAIs include more than 16 S-NSSAIs, the UE may store the first 16 S-NSSAIs and ignore the remaining S-NSSAIs.

Figure 2:
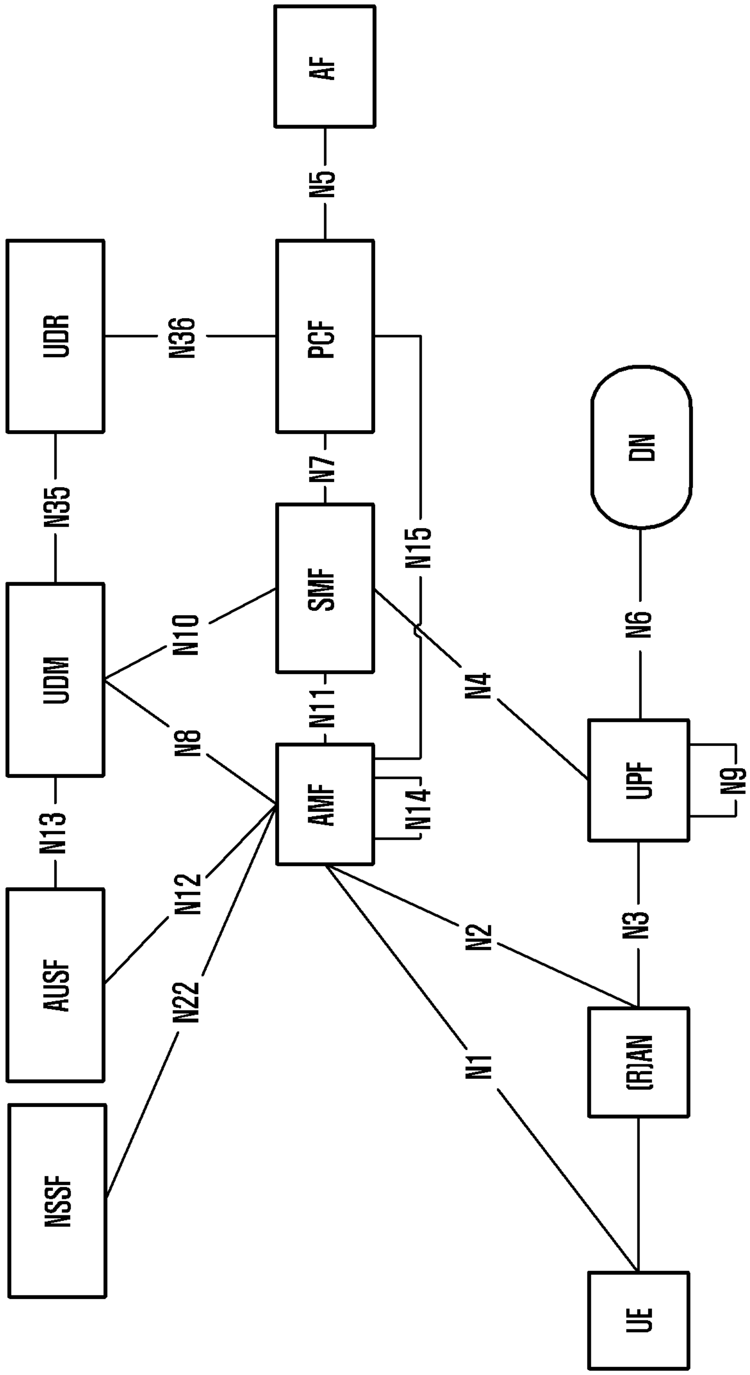
FIG. 2 illustrates a mobile communication system structure according to an embodiment.

FIG. 2 illustrates a mobile communication system structure according to an embodiment. For example, FIG. illustrates a 5G system (5GS) constituted by a UE, an NR BS (i.e., an NG-RAN), and a 5G core network.

Referring to FIG. 2, the 5G core network is constituted by an AMF, a session management function (SMF), a user plane function (UPF), a policy control function (PCF), a UDM, an NSSF, an authentication server function (AUSF), and a unified data repository (UDR). The UE may access the 5G core network through the BS ((R) AN).

Hereinafter, the UE may be referred to as a terminal and the (R) AN may be referred to as a BS.

In addition, the 5G core network further includes an application function (AF) and a data network (DN).

According to an embodiment, the AMF is an NF that manages radio network access and mobility for the UE.

The SMF is an NF that manages a session of the UE, and session information may include quality of service (QOS) information, charging information, and information on packet processing.

The UPF is an NF that processes user traffic (e.g., user plane traffic) and is controlled by the SMF.

The PCF is an NF that manages an operator policy (e.g., PLMN policy) for providing a service in a wireless communication system. In addition, the PCF may be divided into a first PCF that handles an access and mobility (AM) policy and a UE policy and a second PCF that handles a session management (SM) policy. The first PCF that handles the AM/UE policy and the second PCF that handles the SM policy may be configured by logically or physically separated NFs or, unlike this, logically or physically one NF.

The UDM is an NF that stores and manages subscription information of the UE (e.g., a UE subscription).

The UDR may be an NF or a database (DB) that stores and manages data. The UDR may store the subscription information of the UE and provide the subscription information of the UE to the UDM. Further, the UDR may store operator policy information and provide the operator policy information to the PCF.

The NSSF may be an NF that performs a function of selecting network slice instances serving the UE or determining NSSAI.

The AUSF may be an NF that supports authentication for 3GPP access and non-3GPP access.

The AF may be an NF that provides a function for a service according to the disclosure.

The DN provides an operator service, an Internet access, a 3$^{rd}$ party service, etc.

Figure 3:
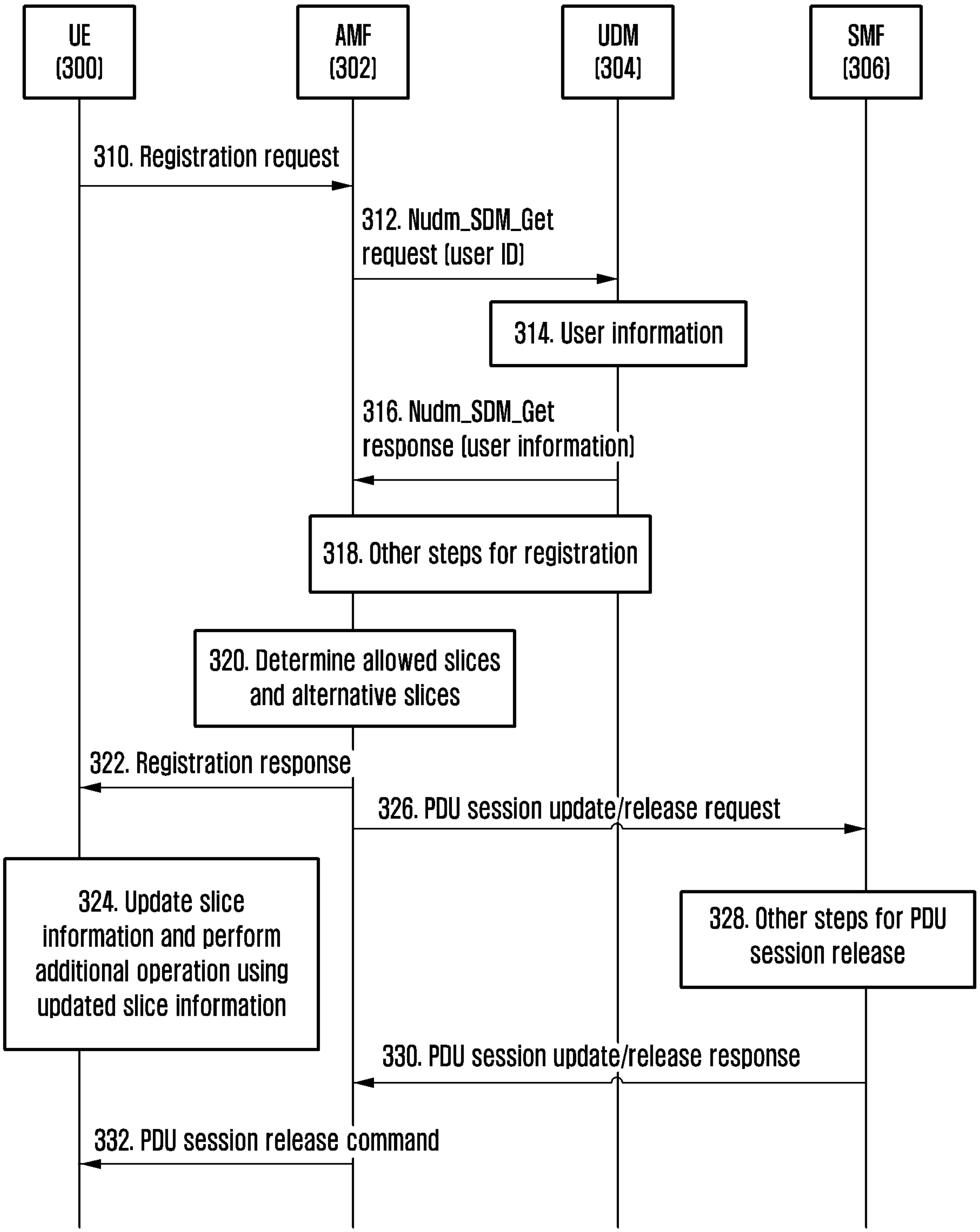
FIG. 3 is a signal flow diagram illustrating a procedure for determining and managing alternative slice information during a registration procedure in a wireless communication system according to an embodiment.

FIG. 3 is a signal flow diagram illustrating a procedure of determining and managing alternative slice information during a registration procedure in a wireless communication system according to an embodiment.

Referring to FIG. 3, in step 310, a UE 300 performs a registration procedure.

In step 310, the UE 300 transmits a registration request message to an AMF 302. The registration request message may include requested slice information (i.e., requested NSSAI) that the UE desires to use. When the UE supports a network slice replacement function, the registration request message may include information indicating that the UE supports the network slice replacement function.

In step 312, the AMF 302 processes the registration request of the UE and transmits, to a UDM 304, a request message for receiving subscription information from the UDM 304. The request message may be a Nudm_SDM_Get request message and may include an identifier (ID) of the UE 300 (e.g., a subscriber ID).

In step 314, the UDM 304 generates a response including subscription information of the UE according to the request from the AMF 302. The response message including the UE subscription information may also include subscribed slices information (e.g., subscribed S-NSSAIs) of the UE.

In step 316, the UDM 304 transmits the subscription information of the UE to the AMF 302 as a response, in which case the used message may be a Nudm_SDM_Get response message.

In step 318, other steps for the registration may be performed.

In step 320, the AMF 302 determines allowed slices and alternative slices. The AMF may determine allowed NSSAIs, based on the requested NSSAIs received in step 310 and the subscribed S-NSSAIs received in step 316. According to an embodiment, the AMF 302 may determine allowed NSSAIs through intersection of the requested NSSAIs, the subscribed S-NSSAIs, and S-NSSAIs that can be supported at a UE location.

In step 320, the AMF 302 may determine whether one or more S-NSSAIs (first S-NSSAIs) included in the allowed NSSAIs are available (unavailable or congested). The AMF 302 may determine whether the first S-NSSAIs included in the allowed NSSAIs are currently unavailable/congested, based on at least one piece of information received from another NF (e.g., a PCF, an NSSF, a network data analytics function (NWDAF), etc.), information received from the OAM, and configuration information (local configuration) stored in the AMF.

In step 320, the AMF 302 may determine alternative S-NSSAIs (second S-NSSAIs) to replace the unavailable first S-NSSAIs, based on whether the network slice replacement of the UE received from the UE in step 310 is supported and the operator policy (local policy). For example, the operator policy may limit alternative slices to be determined only for S-NSSAI for which the UE has established the PDU session. Alternatively, the operator policy may be determined such that alternative slices are determined regardless of whether the UE establishes the PDU session, i.e., even for S-NSSAI for which the UE has not established the PDU session.

In step 320, the AMF 302 may determine whether to provide alternative slices, based on the number of S-NSSAIs included in the allowed NSSAIs. Providing the alternative slices may mean that the allowed NSSAIs include all of the first S-NSSAIs that are currently unavailable/congested and the second S-NSSAIs to be used in replacement of the first S-NSSAIs. Further, providing the alternative slices may include providing alternative NSSAIs including the first S-NSSAIs and the second S-NSSAIs to the UE. When the number of S-NSSAIs included in the allowed NSSAIs including the first S-NSSAIs is smaller than 8 corresponding to the maximum number of S-NSSAIs, the AMF 302 may determine to provide alternative slices. That is, when the allowed NSSAIs do not yet include the maximum number of S-NSSAIs and thus may include the second S-NSSAIs, the AMF 302 may determine to provide alternative slices.

When the number of S-NSSAIs included in the allowed NSSAIs including the first S-NSSAIs is larger than or equal to 8 corresponding to the maximum number of S-NSSAIs and there is no PDU session associated with third S-NSSAIs included in the allowed NSSAIs, the AMF 302 may delete the third S-NSSAIs from the allowed NSSAIs and determine to provide alternative slices.

When the number of S-NSSAIs included in the allowed NSSAIs including the first S-NSSAIs is larger than or equal to 8 corresponding to the maximum number of S-NSSAIs and there are PDU sessions associated with all S-NSSAIs included in the allowed NSSAIs, the AMF 302 may determine not to provide alternative slices.

When the number of S-NSSAIs included in the allowed NSSAIs including the first S-NSSAIs is larger than or equal to 8 corresponding to the maximum number of S-NSSAIs and there are PDU sessions associated with all S-NSSAIs included in the allowed NSSAIs, the AMF 302 may delete the third S-NSSAIs included in the allowed NSSAIs from the allowed NSSAIs, based on operator policy (e.g., an operator's local policy) and determine to provide alternative slices. In this case, which S-NSSAI is to be deleted from the allowed NSSAIs may be determined based on at least one of by the operator policy, information configured by or received from the OAM, and information received from another NF.

When the AMF 302 determines to provide alternative S-NSSAIs (second S-NSSAIs) to replace the unavailable first S-NSSAIs, the AMF 302 may determine alternative slice information, that is, second S-NSSAIs to replace the first S-NSSAIs, based on at least one piece of information received from another NF (e.g., a PCF, an NSSF, an NWDAF, etc.), information received from the OAM, and configuration information (local configuration) stored in the AMF 302 in step 320. The first S-NSSAIs may be subscribed S-NSSAIs of the UE. The subscribed S-NSSAIs may be stored in the UDM 304 and may be one of the S-NSSAIs included in the message received in step 316. The second S-NSSAIs may be or may not be subscribed S-NSSAIs of the UE. The AMF 302 may. configure alternative slice mapping information (mapping information of the first S-NSSAIs and the second S-NSSAIs), that is, alternative NSSAIs. Examples of the alternative NSSAIs are described below. The alternative NSSAIs may include one or more entries, e.g., as shown in Table 1 of FIG. 11

Examples of the entries are described below with reference to Table 2 of FIG. 12. As illustrated in FIG. 12, the entry may include one S-NSSAI (first S-NSSAI) and alternative S-NSSAI (second S-NSSAI) to replace the S-NSSAI.

The AMF 302 may insert alternative S-NSSAIs (second S-NSSAIs) into allowed NSSAIs in order to use the alternative S-NSSAIs (second S-NSSAIs). That is, the allowed NSSAIs may include all of the first S-NSSAIs and the second S-NSSAIs.

The AMF 302 may identify whether the second S-NSSAIs are included in configured NSSAIs. When the second S-NSSAIs are not included in the current configured NSSAIs (first configured NSSAIs) of the UE, the AMF 302 may provide the alternative slices, based on the number of S-NSSAIs included in the configured NSSAIs. Providing the alternative slice may mean that the configured NSSAIs (second S-NSSAIs) include all of the first S-NSSAIs that are currently unavailable/congested and the second S-NSSAIs to be used in replacement of the first S-NSSAIs. Further, providing the alternative slices may mean providing alternative NSSAIs including the first S-NSSAIs and the second S-NSSAIs to the UE.

When the number of S-NSSAIs included in the configured NSSAIs including the first S-NSSAIs is smaller than 16 corresponding to the maximum number of S-NSSAIs, the AMF 302 may add the second S-NSSAIs to the configured NSSAIs.

When the number of S-NSSAIs included in the configured NSSAIs including the first S-NSSAIs is larger than or equal to 16 corresponding to the maximum number of S-NSSAIs and there is no PDU session associated with third S-NSSAIs included in the configured NSSAIs, the AMF 302 may delete the third S-NSSAIs from the configured NSSAIs and determine to add second S-NSSAIs to the configured NSSAIs.

When establishing a PDU session, the UE 300 may use S-NSSAIs included in the allowed NSSAIs. That is, the UE 300 may establish PDU sessions associated with a maximum of 8 S-NSSAIs included in the allowed NSSAIs, and thus only a maximum of 8 S-NSSAIs among 16 S-NSSAIs included in the configured NSSAIs may be included in the allowed NSSAIs and the remaining S-NSSAIs that are not included in the allowed NSSAIs may have no associated PDU session.

Alternatively, when the number of S-NSSAIs included in the allowed NSSAIs including the first S-NSSAIs is larger than or equal to 16 corresponding to the maximum number of S-NSSAIs, the AMF 302 may delete the third S-NSSAIs included in the configured NSSAIs from the configured NSSAIs, based on the operator policy (operator's local policy) and add the second S-NSSAIs to the configured NSSAIs. In this case, which S-NSSAI is to be deleted from the configured NSSAIs may be determined based on at least one of the operator policy, information configured by/received from OAM, information received from another NF.

The AMF 302 may configure a registration response message including the allowed NSSAIs determined in step 320. Further, the registration response message may also include second configured NSSAIs. The registration response message may include alternative NSSAIs (e.g., mapping information of the first S-NSSAIs and the second S-NSSAIs).

In step 322, the AMF 302 transmits a registration response message to the UE, and the message may include at least one of the allowed NSSAIs determined by the AMF 302 in step 320, the configured NSSAIs, and the alternative NSSAIs (alternative slice mapping information).

When the AMF 302 deletes the third S-NSSAIs from the allowed NSSAIs in step 320, the AMF may insert the third S-NSSAIs into the registration response message as one of rejected S-NSSAI (rejected NSSAI), partially rejected S-NSSAI (partially rejected NSSAI), and partially allowed S-NSSAI (partially allowed NSSAI) and transmit the registration response message to the UE 300. Further, the AMF 302 may insert available location information (e.g., a list of tracking areas (TAs)) by which the third S-NSSAIs are supported or unavailable location information (e.g., a list of TAs) by which the third S-NSSAI are not supported into the registration response message.

In step 324, the UE 300 stores the slice information received from the AMF 302 and performs an additional operation.

When it is determined to delete the first S-NSSAIs or the third S-NSSAIs associated with the PDU session from the allowed NSSAIs in step 320, the AMF 302 may perform an operation for releasing the PDU session in step 326. The AMF 302 may transmit a PDU session update request message or a PDU session release request message to the SMF 306. The PDU session update request message or the PDU session release request message may include a release indicator making a request for releasing the PDU session. Further, the PDU session update request message or the PDU session release request message may include an identifier for identifying the PDU session to be released, an SM context ID.

In step 328, the SMF 306 performs an operation for releasing the PDU session identified by the SM context ID.

In step 330, the SMF 306 transmits a response message informing the AMF 302 that the PDU session has been released. The AMF 302 may delete relevant PDU session information from UE context.

In step 332, the AMF 302 transmits a PDU session release message to the UE 300.

Figure 4:
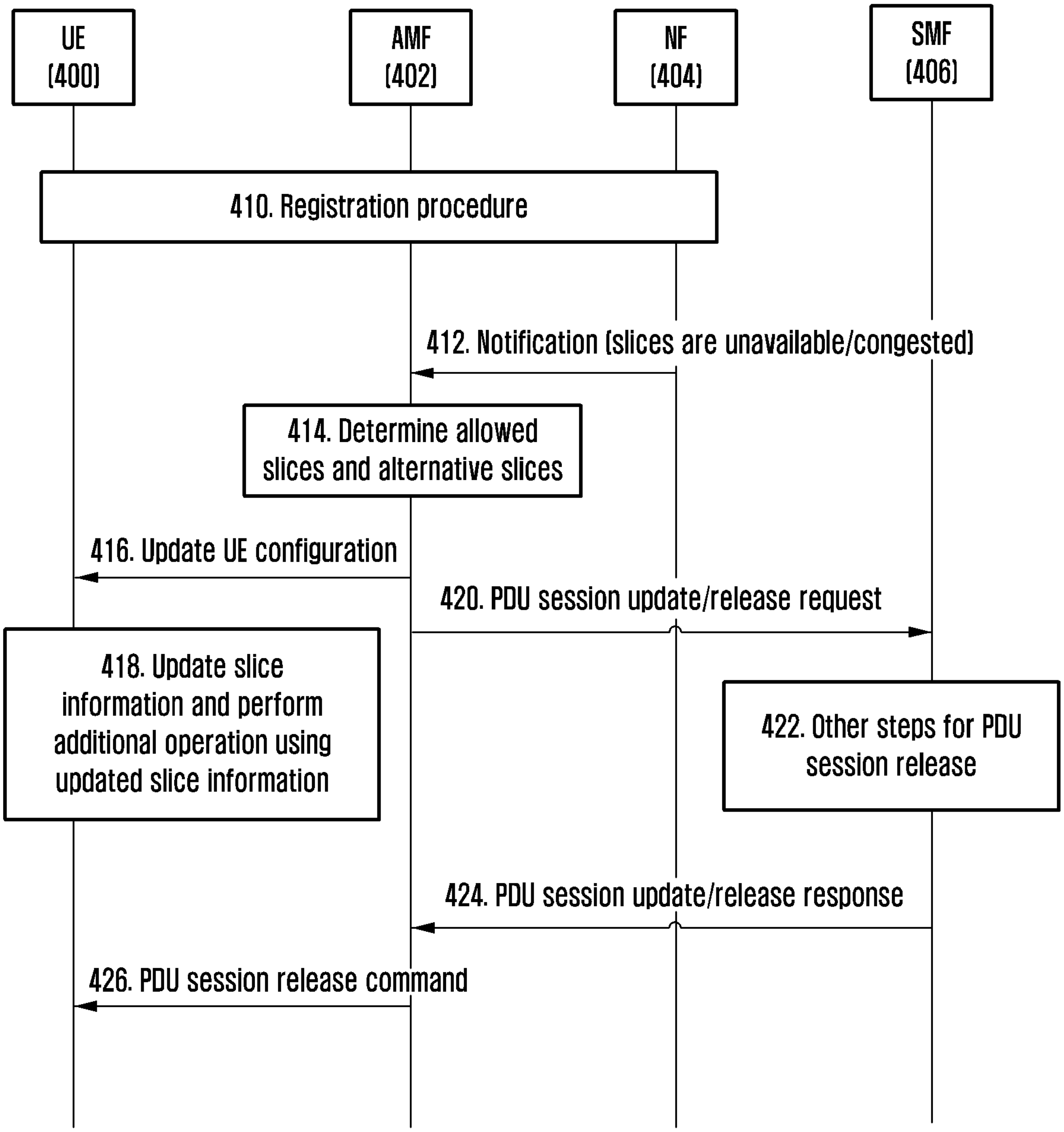
FIG. 4 is a signal flow diagram illustrating a procedure for determining and managing alternative slices by using a UE configuration update procedure in a wireless communication system according to an embodiment.

FIG. 4 is a signal flow diagram illustrating a procedure of determining and managing alternative slices by using a UE configuration update procedure in a wireless communication system according to an embodiment.

Referring to FIG. 4, in step 410, a UE 400 and an AMF 402 perform a UE registration procedure. The AMF 402 may determine first allowed NSSAIs which can be used by the UE and transmit the same to the UE 400 during the registration procedure. The UE 400 may store the first allowed NSSAIs.

In step 412, an NF 404 transmits a notification message to the AMF 402. The notification message may include at least one of first S-NSSAIs that are unavailable or congested, and second S-NSSAIs to replace the first S-NSSAIs. According to an embodiment of the disclosure, the NF 404 may be constituted as at least one of the NFs (e.g., an NSSF, a PCF, an NWDAF, etc.) that constitute the 5G core network illustrated in FIG. 1.

The AMF 402 may determine that the current first S-NSSAIs are unavailable or congested, based on at least one of the notification message received from the NF 404 in step 412, information received from OAM, and configuration information (e.g., local configuration) stored in the AMF 402. Further, the AMF 402 may determine alternative slice information, i.e., second S-NSSAIs to replace the first S-NSSAIs, based on at least one of the notification message received from the NF 404 in step 412, the information received from the OAM, and the configuration information stored in the AMF 402.

In step 414, the AMF 402 determines allowed slices and alternative slices. The AMF 402 may determine whether one or more S-NSSAIs (first S-NSSAIs) included in the allowed NSSAIs, determined in step 410, are available (unavailable or congested). The AMF 402 may determine that the first S-NSSAIs included in the first allowed NSSAIs are currently unavailable or congested, based on at least one of the notification message received in step 412, the information received from the OAM, and the configuration information stored in the AMF 402.

In step 414, the AMF 402 determines second allowed NSSAIs, alternative NSSAIs, and second configured NSSAIs by using the method as described in step 320 of FIG. 3 above.

In step 416, the AMF 402 transmits a UE configuration update message to the UE 400. The message may include at least one of the second allowed NSSAIs, the second configured NSSAIs, and the alternative NSSAIs (alternative slice mapping information) determined by the AMF 402 in step 414.

In step 418, the UE 400 stores slice information received from the AMF 402 and performs an additional operation.

When it is determined to delete the first S-NSSAIs or the third S-NSSAIs associated with the PDU session from the allowed NSSAIs in step 414, the AMF 402 may perform an operation for releasing the PDU session in step 420. The AMF 402 may transmit a PDU session update request message or a PDU session release request message to the SMF 406. The PDU session update request message or the PDU session release request message may include a release indicator making a request for releasing the PDU session. Further, the PDU session update request message or the PDU session release request message may include an identifier for identifying the PDU session to be released, e.g., an SM context ID.

In step 422, the SMF 406 performs an operation for releasing the PDU session identified by the SM context ID.

In step 424, the SMF 406 transmits a response message informing the AMF 402 that the PDU session has been released. The AMF 402 may delete relevant PDU session information from UE context.

In step 426, the AMF 402 transmits a PDU session release message to the UE 400.

Figure 5:
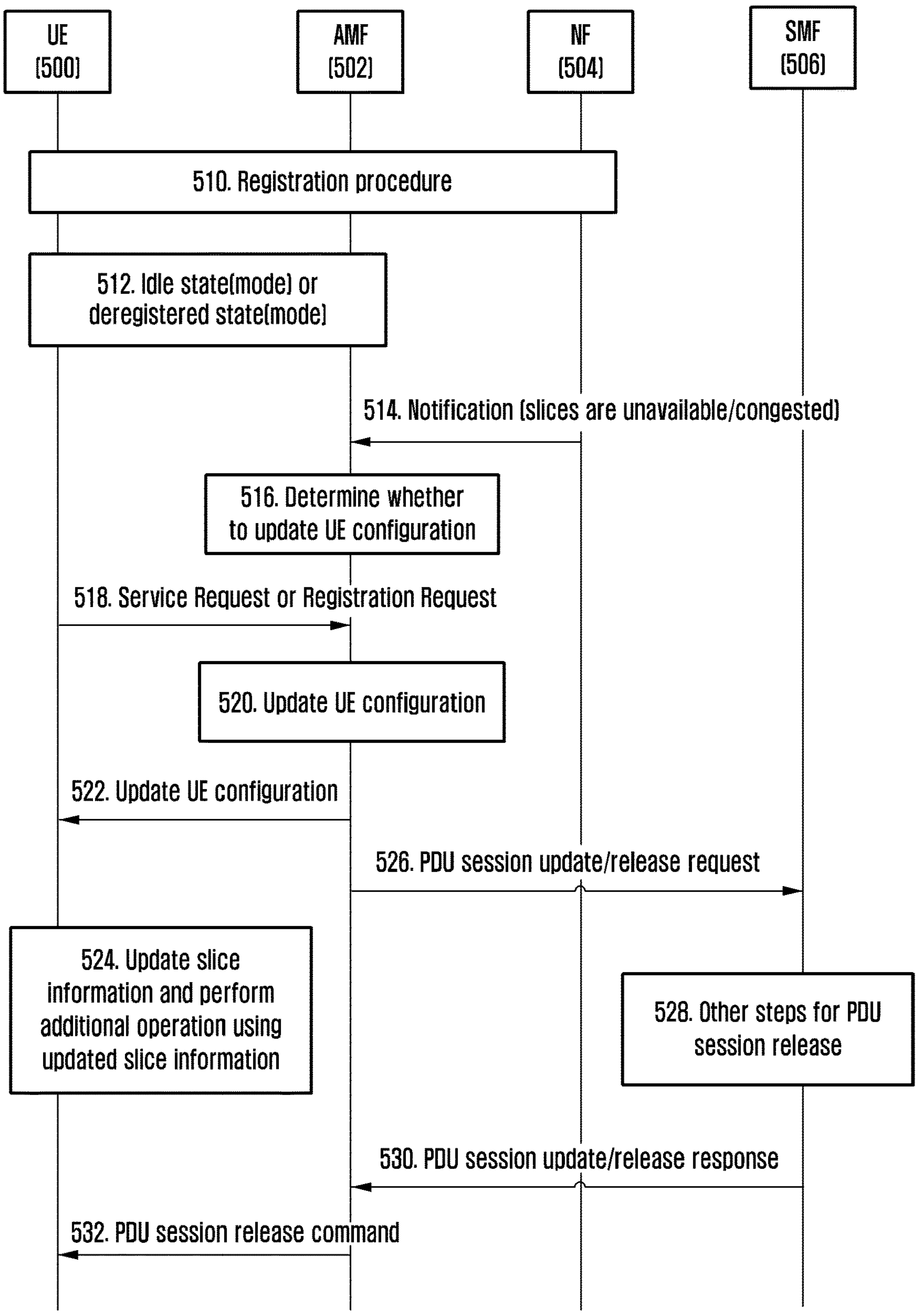
FIG. 5 is a signal flow diagram illustrating a procedure of updating a UE configuration when a UE waits for a connection to a network and then is connected to the network in a wireless communication system according to an embodiment.

FIG. 5 is a signal flow diagram illustrating a procedure of updating a UE configuration when a UE 500 waits for connection to a network and then is connected to the network in a wireless communication system according to an embodiment.

Referring to FIG. 5, in step 510, a UE 500 and an AMF 502 perform a UE registration procedure. The AMF 502 may determine first allowed NSSAIs which can be used by the UE 500 and transmit the same to the UE 500 during the registration procedure. The UE 500 may store the first allowed NSSAIs.

In step 512, the UE 500 may switch to an idle state. That is, the UE 500 having completed the registration procedure in step 510 and using a network service through access to the network may not exchange signaling or data with the network for a predetermined time, and there may be no non-access stratum (NAS) signaling between the UE 500 and the network.

Alternatively, in step 512, the UE 500 may switch to a deregistered state. That is, registration between the UE 500 having completed the registration procedure in step 510 and using a network service through access to the network and the network may be cancelled.

In step 514, an NF 504 transmits a notification message to an AMF 502. The notification message may include at least one of first S-NSSAIs that are unavailable or congested, and second S-NSSAIs to replace the first S-NSSAIs. According to an embodiment of the disclosure, the NF 504 may include at least one of the NFs (e.g., an NSSF, a PCF, an NWDAF, etc.) constituting the 5G core network illustrated in FIG. 1.

The AMF 505 may determine whether the first S-NSSAIs included in the first allowed NSSAIs are currently unavailable or congested, based on at least one of the notification message received from the NF 504 in step 514, information received from OAM, and configuration information (e.g., local configuration) stored in the AMF 502. Further, the AMF 502 may determine that the UE 500 using the first S-NSSAIs is not being connected to the current network. That is, the AMF 502 may not transmit UE configuration information indicating that the first S-NSSAIs are unavailable/congested to the UE 500. The AMF 502 may determine to update UE configuration information when the UE 500 accesses the network again. The AMF 502 may determine allowed NSSAIs, alternative NSSAIs, and configured NSSAIs by using the methods described above in step 320 of FIG. 3.

In step 518, the UE 500 accesses the network again. Step 518 may be performed through a service request procedure or a registration request procedure.

In step 520, the AMF 502 determines that the UE configuration information should be updated. The AMF 502 may determine the allowed NSSAIs, the alternative NSSAIs, and the configured NSSAIs by using the method described in step 320.

In step 522, the AMF 502 may transmit, to the UE 500, at least one of the allowed NSSAIs and the configured NSSAIs determined in step 520. The message in step 522 may be a registration accept message or a UE configuration update message.

In step 524, the UE 500 stores slice information received from the AMF 502 and performs an additional operation.

When it is determined to delete the first S-NSSAIs or the third S-NSSAIs associated with the PDU session from allowed NSSAIs in step 516 or step 520, the AMF 502 may perform step 526 after step 516 or step 520. In step 526, the AMF 502 may perform an operation for releasing the PDU session. The AMF 502 may transmit a PDU session update request message or a PDU session release request message to the SMF 506. The PDU session update request message or the PDU session release request message may include a release indicator making a request for releasing the PDU session. Further, the PDU session update request message or the PDU session release request message may include an identifier for identifying the PDU session to be released, e.g., an SM context ID.

In step 528, the SMF 506 performs an operation for releasing the PDU session identified by the SM context ID.

In step 530, the SMF 506 transmits a response message informing the AMF 502 that the PDU session has been released. The AMF 502 may delete relevant PDU session information from UE context.

In step 532, the AMF 502 transmits a PDU session release message to the UE 500.

Figure 6:
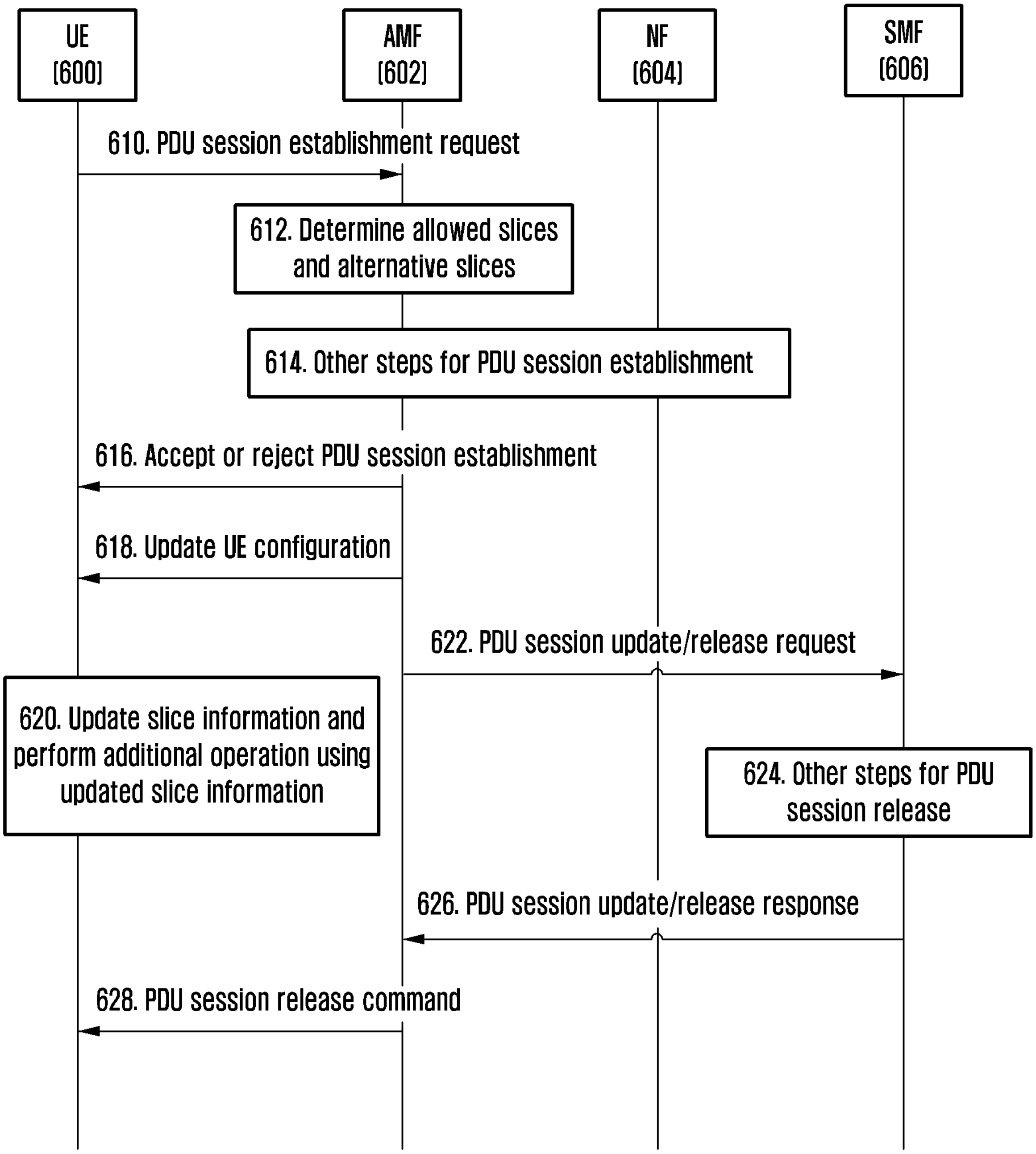
FIG. 6 is a signal flow diagram illustrating a new PDU session establishment procedure in a wireless communication system according to an embodiment.

FIG. 6 is a signal flow diagram illustrating a new PDU session establishment procedure in a wireless communication system according to an embodiment.

Referring to FIG. 6, in step 610, a UE 600 determines to establish a PDU session and transmits a PDU session establishment request to an AMF 602. The PDU session establishment request message may include at least one of a PDU session ID and first S-NSSAIs. The first S-NSSAIs may be S-NSSAIs included in allowed NSSAIs.

In step 612, the AMF 602 processes the PDU session establishment request message of the UE. The AMF may identify whether the first S-NSSAIs are available. The AMF 602 may determine that the first S-NSSAIs included in the PDU session establishment request message are currently unavailable or congested, based on at least one of a notification message received from an NF 604, information received from OAM, and configuration information (e.g., local configuration) stored in the AMF 602. According to an embodiment of the disclosure, the NF 604 may include at least one of the NFs (e.g., an NSSF, a PCF, an NWDAF, etc.) included in the 5G core network illustrated in FIG. 1.

In step 612, the AMF 602 may determine second allowed NSSAIs, alternative NSSAIs, and second configured NSSAIs by using the methods described above in step 320 of FIG. 3.

In step 614, the AMF 602 processes a PDU session establishment request of the UE 600. When the AMF 602 determines to use the second S-NSSAIs in replacement of the first S-NSSAIs in step 612, the AMF may perform a PDU session establishment procedure by using the alternative S-NSSAIs (second S-NSSAIs) determined in step 612. When slices to replace the unavailable/congested first S-NSSAIs are not determined in step 612, the AMF 602 may not perform the PDU session establishment procedure. That is, in this case, step 614 may not be performed.

When step 614 is performed, the AMF 602 may transmit a PDU session establishment accept message to the UE 600 in step 616. The PDU session establishment accept message may include at least one of a PDU session ID, the first S-NSSAIs, and the alternative S-NSSAIs (second S-NSSAIs) determined by the AMF 602. Alternatively, when step 614 is not performed, the AMF 602 may transmit a PDU session establishment reject message to the UE 600.

When the AMF 602 determines to use the second S-NSSAIs in replacement of the first S-NSSAIs in step 612, the AMF 602 may perform step 618. In step 618, the AMF 602 may transmit at least one of the allowed NSSAIs, the alternative NSSAIs, and the configured NSSAIs determined in step 612 to the UE 600. The message in step 618 may be a UE configuration update message.

In step 620, the UE 600 updates slice information. For example, the UE 600 may store the information received in step 616 and step 618.

When it is determined to delete the first S-NSSAIs or third S-NSSAIs associated with the PDU session from the allowed NSSAIs in step 612, the AMF 602 may perform an operation for releasing the PDU session in step 622. The AMF 602 may transmit a PDU session update request message or a PDU session release request message to the SMF 606. The PDU session update request message or the PDU session release request message may include a release indicator making a request for releasing the PDU session. Further, the PDU session update request message or the PDU session release request message may include an identifier for identifying the PDU session to be released, e.g., an SM context ID.

In step 624, the SMF 606 performs an operation for releasing the PDU session identified by the SM context ID.

In step 626, the SMF 606 transmits a response message informing the AMF 602 that the PDU session has been released. The AMF 602 may delete relevant PDU session information from UE context.

In step 628, the AMF 602 transmits a PDU session release message to the UE 600.

Figure 7:
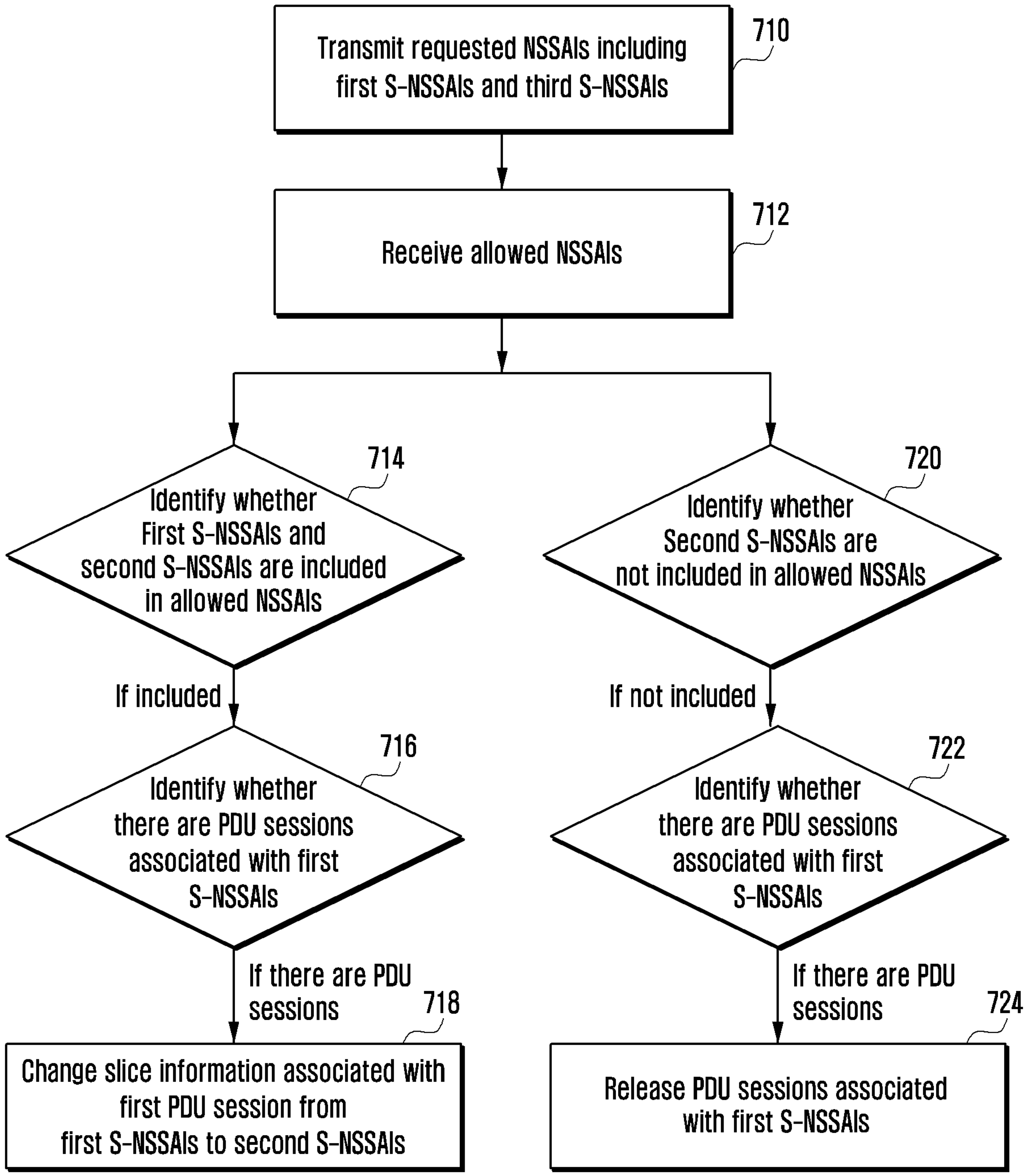
FIG. 7 is a flow chart illustrating a procedure in which a UE performs an operation according to whether alternative slice information is included in allowed NSSAIs in a communication system according to an embodiment.

FIG. 7 is a flow chart illustrating a procedure in which a UE performs an operation according to whether alternative slice information is included in allowed NSSAIs in a communication system according to an embodiment.

Referring to FIG. 7, in step 710, the UE transmits first S-NSSAIs included in allowed NSSAIs and requested S-NSSAIs including third S-NSSAIs distinguished from the first S-NSSAIs and second S-NSSAIs corresponding to alternative slice information to an AMF.

In step 712, the UE receives the allowed NSSAIs from the AMF. The UE may perform different operations according to whether the second S-NSSAIs are included in the allowed NSSAIs received from the AMF.

In step 714, the UE identifies whether the allowed NSSAIs received from the AMF include the first S-NSSAIs and the second S-NSSAIs.

In step 716, the UE may identify whether there is a PDU session associated with the first S-NSSAIs.

When it is identified that there is the PDU session associated with the first S-NSSAIs in step 716, the UE changes, in regard to the PDU session identified to be associated with the first S-NSSAIs, network slice information connected to the corresponding PDU session from the first S-NSSAIs to the second S-NSSAIs in step 718.

In step 720, the UE identifies whether the second S-NSSAIs are not included in the allowed NSSAIs received from the AMF. In step 722, the UE may identify whether there is a PDU session associated with the first S-NSSAIs, and when there is the PDU session associated with the first S-NSSAIs, release the corresponding PDU session in step 724.

Figure 8:
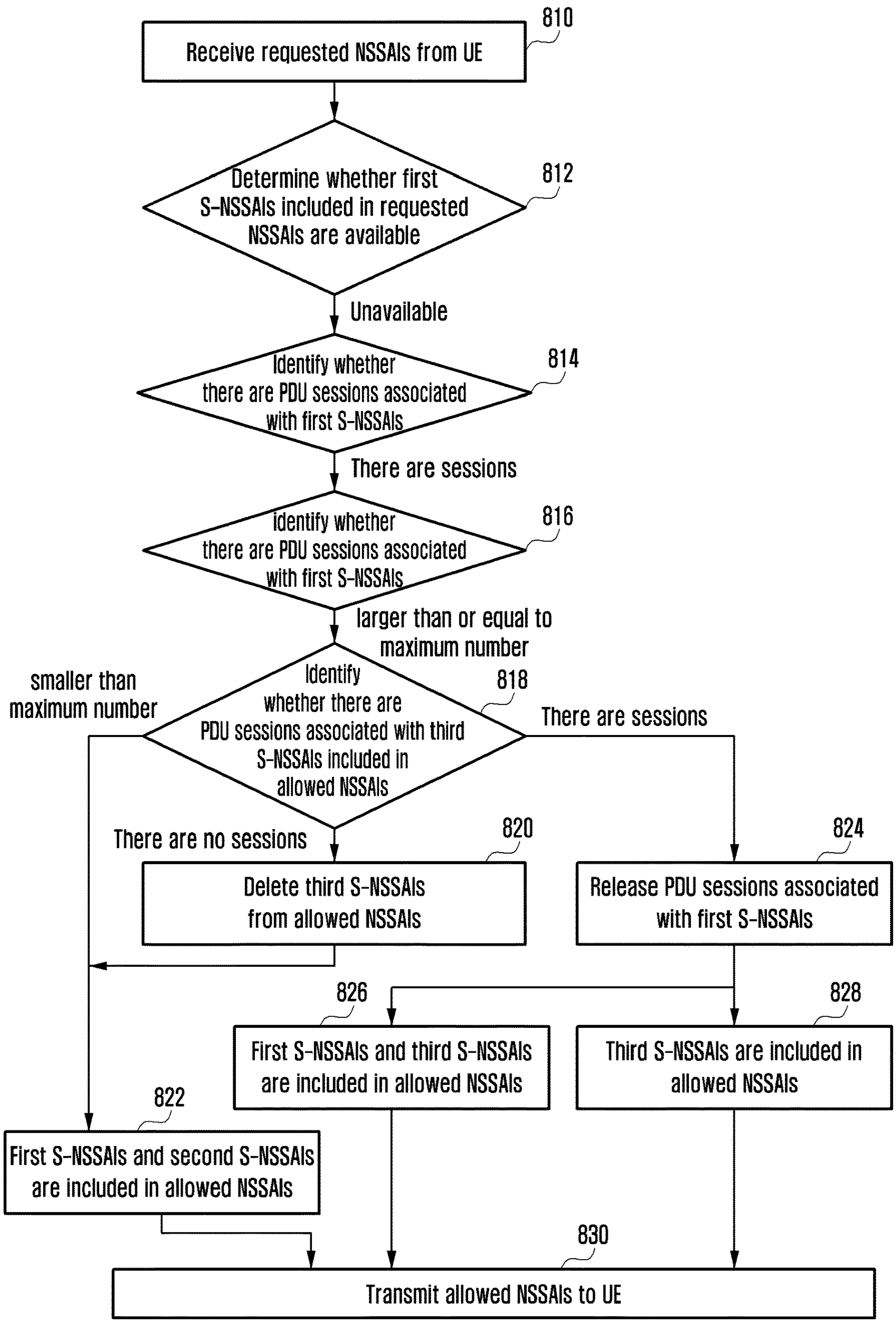
FIG. 8 is a flow chart illustrating a procedure in which an AMF performs an operation of receiving requested NSSAIs from a UE and determines S-NSSAIs to be included in allowed NSSAIs to be transmitted to the UE in response thereto in a communication system according to an embodiment.

FIG. 8 is a flow chart illustrating a procedure in which an AMF performs an operation of receiving requested NSSAIs from a UE and determines S-NSSAIs to be included in allowed NSSAIs to be transmitted to the UE in response thereto in a communication system according to an embodiment.

Referring to FIG. 8, in step 810, the AMF receives requested NSSAIs from the UE.

In step 812, the AMF determines whether first S-NSSAIs included in the received requested NSSAIs are available. The AMF may determine whether the first S-NSSAIs is currently unavailable or is congested, based on at least one of information received from at least one of the NFs (e.g., an NSSF, a PCF, an NWDAF, etc.) included in a 5G core network as illustrated in FIG. 1, information received from OAM, and configuration information (local configuration) stored in the AMF.

When the first S-NSSAIs are unavailable or congested in step 812, the AMF identifies whether there are PDU sessions associated with the first S-NSSAIs in step 814.

When it is identified that there are PDU sessions associated with the first S-NSSAIs in step 814, the AMF identifies a total number of S-NSSAIs included in allowed NSSAIs in step 816.

When the total number of S-NSSAIs included in the allowed NSSAIs is larger than or equal to the maximum number of S-NSSAIs that can be included in the allowed NSSAIs, the AMF identifies whether there are PDU sessions associated with third S-NSSAIs included in the allowed NSSAIs in step 818.

When it is identified that there are no PDU sessions associated with the third S-NSSAIs included in the allowed NSSAIs in step 818, the AMF deletes the third NSSAIs from the allowed NSSAIs in step 820. In this case, which S-NSSAI is to be deleted from the allowed NSSAIs may be determined based on at least one of the operator policy, information configured by the OAM or received from the OAM, or information received from another NF.

When it is identified that there are PDU sessions associated with the third S-NSSAIs included in the allowed NSSAIs in step 818, the AMF releases the PDU sessions associated the first S-NSSAIs in step 824.

According to an embodiment, like in step 826, at least some of the first S-NSSAIs and the third S-NSSAIs may be included in the allowed NSSAIs. According to another embodiment, like in step 828, the allowed NSSAIs may include only the third NSSAIs.

When the AMF identifies the total number of S-NSSAIs included in the allowed NSSAIs in step 816, if the total number of S-NSSAIs included in the allowed NSSAIs is smaller than the maximum number of S-NSSAIs that can be included in the allowed NSSAIs, the AMF inserts the first S-NSSAIs and the second S-NSSAIs into the allowed NSSAIs in step 822.

Further, after the AMF deletes the third S-NSSAIs from the allowed NSSAIs in step 820, the AMF may insert the first S-NSSAIs and the second S-NSSAIs into the allowed NSSAIs in step 822.

In step 830, the AMF transmits the allowed NSSAIs to the UE.

Figure 9:
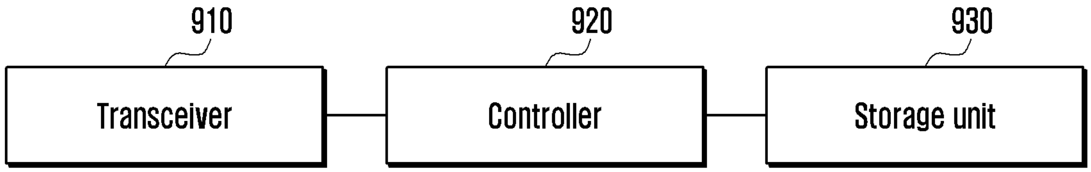
FIG. 9 illustrates a UE according to an embodiment.

FIG. 9 illustrates a UE according to an embodiment.

Referring to FIG. 9, the UE includes a transceiver 910, a controller 920, and a storage unit 930. The controller 920 may be defined as a circuit, an ASIC, or at least one processor.

The transceiver 910 may transmit and receive signals to and from another network entity. The transceiver 910 may receive, e.g., system information from a BS and receive a synchronization signal or a reference signal.

The controller 920 may control the overall operation of the UE according to the above-described embodiments. For example, the controller 920 may control the signal flow between respective blocks to transfer requested NSSAIs to the AMF according to an embodiment of the disclosure, receive allowed NSSAIs in response thereto, update network slice information, based on the received allowed NSSAIs, and use the same.

The storage unit 930 may store at least one piece of information transmitted and received through the transceiver 910 and information generated through the controller 920. For example, the storage unit 930 may store each of S-NSSAI included in the requested NSSAIs and the allowed NSSAIs.

Figure 10:
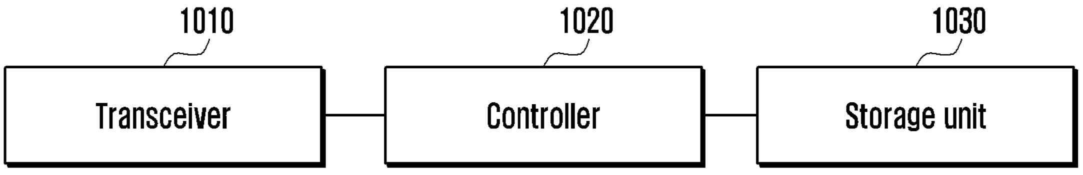
FIG. 10 illustrates a network entity according to an embodiment.

FIG. 10 illustrates a network entity according to an embodiment. For example, the network entity illustrated in FIG. 10 may be, for example, a UPF, an AMF, an SMF, a PCF, a UDR, a UDM, an NSSF, an AUSF, etc.

Referring to FIG. 10, the network entity includes a transceiver 1010, a controller 1020, and a storage unit 1030. The controller 1020 may be defined as a circuit, an ASIC, or at least one processor.

The transceiver 1010 may transmit and receive signals to and from another network entity. The transceiver 1010 may receive system information from, e.g., a UE, a BS, or another network entity, and receive a synchronization signal or a reference signal.

The controller 1020 may control the overall operation of the network entity according to the above-described embodiments. For example, the controller 1020 may control a node to transmit and receive information on network slices to and from other nodes according to the embodiments disclosed in the disclosure.

The storage unit 1030 may store at least one piece of information transmitted and received through the transceiver 1010 and information generated through the controller 1020. For example, the storage unit 1030 may store requested NSSAIs, allowed NSSAIs, configured NSSAIs, alternative S-NSSAIs, and the like.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method performed by an access and mobility management function (AMF) in a wireless communication system, the method comprising:
receiving, from a user equipment (UE), requested network slice selection assistance information (NSSAI) including a plurality of single-NSSAI (S-NSSAI);
identifying whether each of the plurality of S-NSSAI is available;
identifying a number of S-NSSAIs included in an allowed NSSAI;
in case that the number of S-NSSAIs in the allowed NSSAI is less than a maximum number of S-NSSAIs for the allowed NSSAI, determining to include alternative S-NSSAI for a first S-NSSAI that is not available; and
in case that the number of S-NSSAIs in the allowed NSSAI is at least equal to the maximum number of S-NSSAIs for the allowed NSSAI, determining S-NSSAIs for the allowed NSSAI based on whether each of the plurality of S-NSSAI is associated with a protocol data unit (PDU) session.

2. The method of claim 1, wherein determining the S-NSSAIs for the allowed NSSAI based on whether each of the plurality of S-NSSAI is associated with the PDU session comprises removing a second S-NSSAI that is available and not associated with the PDU session from the allowed NSSAI.

3. The method of claim 1, wherein the first S-NSSAI is associated with a PDU session.

4. The method of claim 1, further comprising transmitting, to the UE, a UE configuration update message including information on mapping between the first S-NSSAI and the alternative S-NSSAI.

5. The method of claim 1, wherein the maximum number of S-NSSAIs for the allowed NSSAI is configured to 8.

6. A method performed by a user equipment (UE) in a wireless communication system, the method comprising:
transmitting, to an access and mobility management function (AMF), a requested network slice selection assistance information (NSSAI) including a first single-NSSAI (S-NSSAI) to be included in an allowed NSSAI and a second S-NSSAI;
receiving, from the AMF, the allowed NSSAI;
identifying whether the allowed NSSAI includes an alternative S-NSSAI for the first S-NSSAI; and
in case that the alternative S-NSSAI is included in the allowed NSSAI, modifying network slice information for a protocol data unit (PDU) session associated with the first S-NSSAI to the alternative NSSAI.

7. The method of claim 6, further comprising, in case that the alternative S-NSSAI is not included in the allowed NSSAI, releasing the PDU session associated with the first S-NSSAI.

8. The method of claim 6, wherein identifying whether the allowed NSSAI includes the alternative S-NSSAI for the first S-NSSAI is performed based on a UE configuration update message, and
wherein the UE configuration update message includes information on mapping between the first S-NSSAI and the alternative S-NSSAI.

9. An access and mobility management function (AMF) in a wireless communication system, the AMF comprising:
a transceiver; and
a controller coupled with the transceiver and configured to:
receive, from a user equipment (UE), requested network slice selection assistance information (NSSAI) including a plurality of single-NSSAI (S-NSSAI),
identify whether each of the plurality of S-NSSAI is available,
identify a number of S-NSSAIs included in an allowed NSSAI,
in case that the number of S-NSSAIs in the allowed NSSAI is less than a maximum number of S-NSSAIs for the allowed NSSAI, determine to include alternative S-NSSAI for a first S-NSSAI that is not available, and
in case that the number of S-NSSAIs in the allowed NSSAI is at least equal to the maximum number of S-NSSAIs for the allowed NSSAI, determine S-NSSAIs for the allowed NSSAI based on whether each of the plurality of S-NSSAI is associated with a protocol data unit (PDU) session.

10. The AMF of claim 9, wherein the controller is further configured to remove a second S-NSSAI that is available and not associated with the PDU session from the allowed NSSAI.

11. The AMF of claim 9, wherein the first S-NSSAI is associated with a PDU session.

12. The AMF of claim 9, wherein the controller is further configured to transmit, to the UE, a UE configuration update message including information on mapping between the first S-NSSAI and the alternative S-NSSAI.

13. The AMF of claim 9, wherein the maximum number of S-NSSAIs for the allowed NSSAI is configured to 8.

14. A user equipment (UE) in a wireless communication system, the UE comprising:
a transceiver; and
a controller coupled with the transceiver and configured to:
transmit, to an access and mobility management function (AMF), a requested network slice selection assistance information (NSSAI) including a first single-NSSAI (S-NSSAI) to be included in an allowed NSSAI and a second S-NSSAI,
receive, from the AMF, the allowed NSSAI,
identify whether the allowed NSSAI includes an alternative S-NSSAI for the first S-NSSAI, and
in case that the alternative S-NSSAI is included in the allowed NSSAI, modify network slice information for a protocol data unit (PDU) session associated with the first S-NSSAI to the alternative NSSAI.

15. The UE of claim 14, wherein the controller is further configured to, in case that the alternative S-NSSAI is not included in the allowed NSSAI, release the PDU session associated with the first S-NSSAI.

16. The UE of claim 14, wherein the identification of whether the allowed NSSAI includes the alternative S-NSSAI for the first S-NSSAI is performed based on a UE configuration update message, and
wherein the UE configuration update message includes information on mapping between the first S-NSSAI and the alternative S-NSSAI.

* * * * *